United States Patent [19]

Bourne

[11] 4,275,824

[45] Jun. 30, 1981

[54] ROTARY VALVES

[75] Inventor: John W. Bourne, Sandton, South Africa

[73] Assignee: Joyce Anne Bourne, Morningside, South Africa

[21] Appl. No.: 879,947

[22] Filed: Feb. 17, 1978

[30] Foreign Application Priority Data

Feb. 17, 1977 [ZA] South Africa .............. 77/0956

[51] Int. Cl.³ .............................................. G01F 11/24
[52] U.S. Cl. ................................... 222/148; 222/342; 222/368
[58] Field of Search .................. 222/342, 368, 148

[56] References Cited

U.S. PATENT DOCUMENTS

| | | | |
|---|---|---|---|
| 2,816,693 | 12/1957 | Greaves et al. | 222/148 X |
| 2,921,721 | 1/1960 | Brooks | 222/368 |
| 3,052,383 | 9/1962 | Transeau | 222/368 X |
| 3,602,552 | 8/1971 | Morgan | 198/672 X |
| 4,109,966 | 8/1978 | Boyhont et al. | 198/672 X |

*Primary Examiner*—Robert J. Spar
*Assistant Examiner*—Frederick R. Handren
*Attorney, Agent, or Firm*—Haseltine and Lake

[57] ABSTRACT

The invention provides for a rotary valve of the type employed for transporting solid material between zones having a fluid pressure differential, with a minimum fluid leakage between the zones. The valve has a housing with a bore, passages communicating with the bore and designed to be coupled to the respective zones, and a rotor which is housed within the bore. The rotor is defined by an axial drive shaft, a pair of spaced end plates on the shaft and a series of radial vanes disposed between the end plates. The valve is formed with material deflecting formations on the peripheral surfaces of the end plates the formations being adapted for urging material inwardly into the zone intermediate the end plates upon rotation of the rotor in a predetermined direction.

2 Claims, 2 Drawing Figures

ROTARY VALVES

BACKGROUND OF THE INVENTION

This invention relates to rotary valves or the like.

Rotary valves are normally employed between zones having a fluid pressure differential, and serve to permit solid materials to pass from one zone to another with a minimum fluid leakage between the zones. Known rotary valves generally comprise a housing having a bore, passages communicating with the bore and adapted to be coupled to the respective zones and a rotor which is a snug fit within the bore, the rotor defining an axial drive shaft, a pair of spaced end plates on the shaft and a series of radial vanes disposed between the end plates. Such valves are referred to hereinafter as rotary valves of the type described. A problem associated with known rotary valves is that material passing through the valve tends to enter the space between the peripheries of the end plates and the bore of the housing causing rapid wear. Where seals are provided between the bore and end plates, these are prone to break-down.

SUMMARY OF THE INVENTION

An object of the present invention is the provision of a novel rotary valve which it is believed will minimise the abovementioned problem.

According to the invention a rotary valve of the type described is characterised in the provision of material deflecting means associated with the peripheral surfaces of the end plates, the means being adapted to urge material in the zone of such peripheral surfaces inwardly towards the zone intermediate the end plates upon rotation of the rotor in a predetermined direction.

In a preferred arrangement the deflecting means is provided on the peripheral surface of each end plate, such that the means lies in close proximity to the bore of the housing.

Further according to the invention the deflecting means is in the nature of a generally helically wound, thread or groove in the peripheral surface of each end plate, the direction of the windings being such that material in the threads is directed inwardly as aforesaid. Thus it is envisaged that a right hand thread will be provided on the periphery of one end plate while the thread on the other end plate will be of the opposite hand.

It will be appreciated that upon rotation of the rotor the action of the threads will also serve to direct ambient air into the zone between the end plates, thus facilitating the material clearing function of the threads.

The invention is further directed to a rotor as disclosed herein, suitable for use in the valve of the invention.

In order more clearly to illustrate the invention an embodiment thereof is described hereunder purely by way of example with reference to the accompanying drawings wherein:

IN THE DRAWINGS

DESCRIPTION OF THE INVENTION

Figure 1:
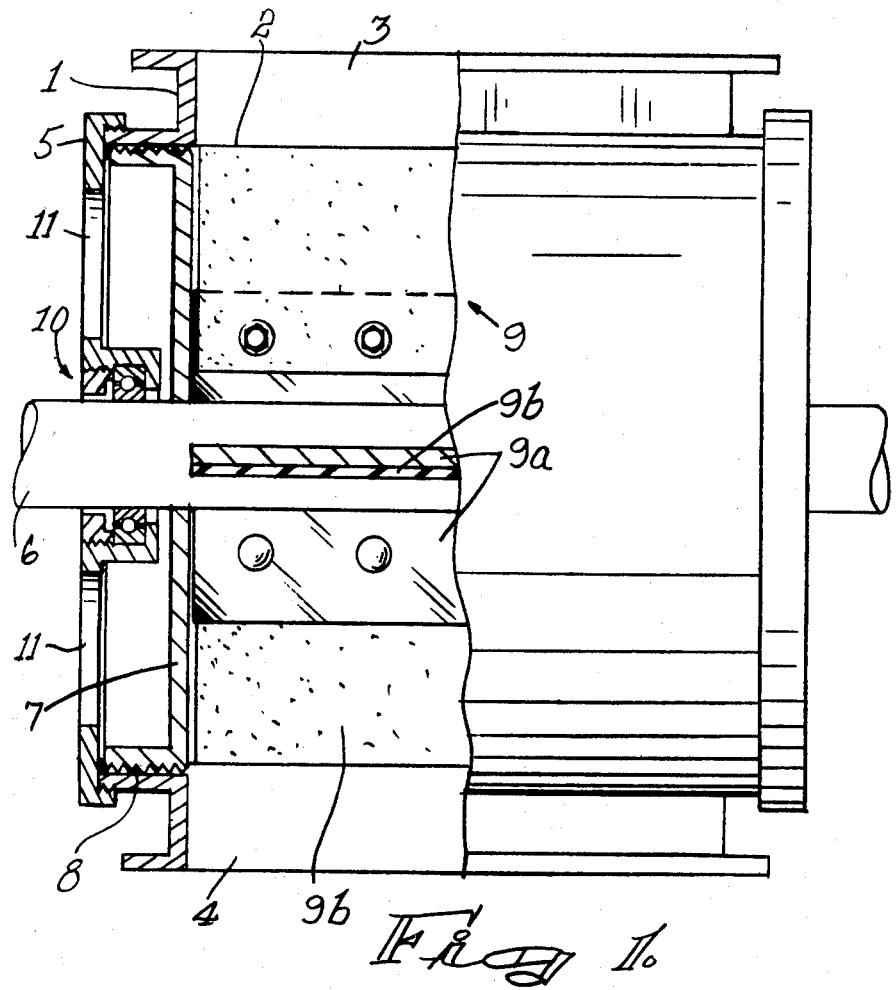
FIG. 1 is a partially sectioned elevation of a rotary valve.
Figure 2:
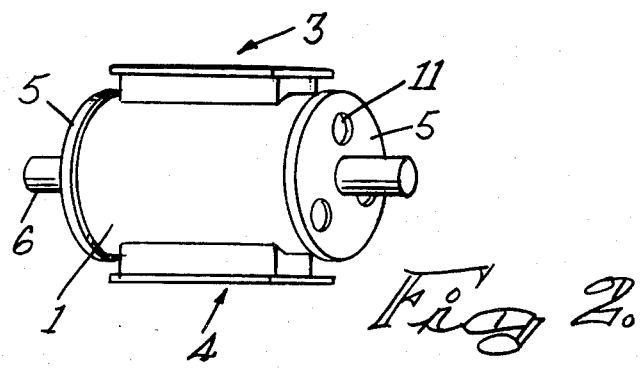
FIG. 2 is a perspective view on reduced scale of the valve in FIG. 1.

Referring to the drawings a rotary valve includes a housing 1 having a circular bore 2 therethrough. A pair of opposed ports 3 and 4 communicate with the bore 2. In use the ports are coupled respectively to zones which are at different pressures. Housed within the bore 2 is a rotor which comprises an axial shaft 6, a pair of spaced end plates 7, and a plurality of vanes 9. The housing 1 is provided with removable closure plates 5 which serve to locate the rotor axially and further carry bearings 10 for the shaft 6.

In the arrangement of the invention the peripheral surfaces 8 of the end plates 7 are of relatively wide construction. In one arrangement the peripheral surface may be defined by outwardly directed flange formations as illustrated. Alternatively the end plates 7 may be in the form of a relatively wide disc. Each peripheral surface 8 of the end plate 7 is provided with a screw thread therein, with the direction of the screw thread being such that upon rotation of shaft 6 in a particular direction, the thread acts to urge material inwardly towards the vane area of the rotor. It will be appreciated that the threads on the respective rotors will be opposed to one another.

It is believed that the provision of threads on the surfaces 8 will effectively serve to prevent material passing through the valve from entering between the bore 2 and surfaces 8, thus reducing wear in this area. Since it is important to maintain close tolerances between the bore 2 and surfaces 8 to minimise air leakage into the valve, it is believed that a significant advantage will result from the arrangement of the invention.

Holes 11, permit the entry of air already referred to which might leak inwards between the threaded peripheral surface of the end plates 8 and the bore of the casing 2.

Clearly many variations of the invention exist and it is envisaged that these all fall within the scope of this disclosure. For example in the arrangement illustrated the vanes 9 comprise resilient flap elements 9b bolted to radial flanges 9a. Clearly the invention is also applicable to arrangements where the vanes are in other forms, such as rigid machined members, or of the type having spring loaded tip elements. Moreover deflecting formations other than the screw thread illustrated could be employed.

I claim:

1. A rotary type valve of the type having a housing with a bore, passages communicating with the bore and adapted to be coupled to respective zones of differing fluid pressure, a rotor which is a snug fit within the bore, the rotor defining an axial drive shaft, a pair of spaced end plates on the shaft and a series of radial vanes disposed between the end plates, wherein: in the provision of material deflecting formations associated with peripheral surfaces of the end plates, the formations being adapted to urge material in the zone of such peripheral surfaces inwardly towards the zone intermediate the end plates upon rotation of the rotor in a predetermined direction, the deflecting formations are a generally helically wound thread or groove disposed in the peripheral surface of each end plate, the pitch of the threads being such that material in the threads is directed inwardly upon rotation of the rotor in a predetermined direction.

2. A rotary type valve of the type having a housing with a bore, passages communicating with the bore and adapted to be coupled to respective zones of differing fluid pressure, a rotor which is a snug fit within the bore, the rotor defining an axial drive shaft, a pair of spaced end plates on the shaft and a series of radial vanes disposed between the end plates, wherein: in the provision of material deflecting formations associated with peripheral surfaces of the end plates, the formations being adapted to urge material in the zone of such peripheral surfaces inwardly towards the zone intermediate the end plates upon rotation of the rotor in a predetermined direction, upon rotation of the rotor in said predetermined direction the action of the deflecting formations also directs ambient air into the zone between the end plates, thus facilitating the material clearing function of the deflecting formations.

* * * * *